(12) United States Patent
Merchant et al.

(10) Patent No.: US 10,240,482 B2
(45) Date of Patent: Mar. 26, 2019

(54) VENT SYSTEM FOR LOAD COUPLING GUARD

(71) Applicant: General Electric Company, Schenectady, NY (US)

(72) Inventors: Laxmikant Merchant, Bangalore (IN); Dinesh Venugopal Setty, Bangalore (IN); Avishetti Srinivas, Bangalore (IN); S. T. Deepak, Bangalore (IN)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 131 days.

(21) Appl. No.: 15/222,102

(22) Filed: Jul. 28, 2016

(65) Prior Publication Data

US 2018/0030853 A1 Feb. 1, 2018

(51) Int. Cl.
| | |
|---|---|
| *F01D 25/14* | (2006.01) |
| *F01D 15/10* | (2006.01) |
| *F01D 25/04* | (2006.01) |
| *H02K 7/00* | (2006.01) |
| *H02K 7/18* | (2006.01) |
| *H02K 9/10* | (2006.01) |

(52) U.S. Cl.
CPC .............. *F01D 25/14* (2013.01); *F01D 15/10* (2013.01); *F01D 25/04* (2013.01); *H02K 7/003* (2013.01); *H02K 7/1823* (2013.01); *F05D 2220/32* (2013.01); *F05D 2220/76* (2013.01); *F05D 2240/14* (2013.01); *F05D 2260/96* (2013.01); *H02K 9/10* (2013.01); *Y10T 464/10* (2015.01)

(58) Field of Classification Search
CPC .......... F01D 25/14; F01D 25/04; F01D 15/10; H02K 7/003; H02K 7/1823; F05D 2260/96; F05D 2240/14; F05D 2220/76; F05D 2220/32; Y10T 464/10
USPC .......... 60/721, 912; 464/17, 170; 310/85, 89; 415/108, 119; 74/609
See application file for complete search history.

(56) References Cited

U.S. PATENT DOCUMENTS

| | | | | |
|---|---|---|---|---|
| 2,775,104 | A * | 12/1956 | Karcher | F16C 37/00 464/17 X |
| 6,966,838 | B2 * | 11/2005 | Herchenbach | A01B 71/08 464/17 |
| 7,528,513 | B2 * | 5/2009 | Oh | H02K 11/40 |
| D773,995 | S * | 12/2016 | Jabaji | |
| 2013/0139516 | A1 | 6/2013 | Viti et al. | |
| 2016/0348584 | A1 * | 12/2016 | Ponyavin | F01D 15/10 |

* cited by examiner

*Primary Examiner* — Greg Binda
(74) *Attorney, Agent, or Firm* — GE Global Patent Operation; John Darling

(57) ABSTRACT

A gas turbine system includes a load coupling connecting a gas turbine to a generator. A load coupling guard surrounds the load coupling to define an enclosed spaced around the load coupling. The load coupling guard includes a porous sleeve such that hydrogen coolant leaked into the load coupling guard from the generator is vented to ambient air.

13 Claims, 6 Drawing Sheets

VENT SYSTEM FOR LOAD COUPLING GUARD

TECHNICAL FIELD

This invention relates generally to turbomachine systems and, more specifically, to a vent system for a load coupling guard of a gas turbine system.

BACKGROUND

Gas turbomachines typically include a compressor portion, a turbine portion and a combustor assembly. The combustor assembly mixes fluid from the compressor portion with a fuel to form a combustible mixture. The combustible mixture is combusted forming hot gases that pass along a hot gas path of the turbine portion. The turbine portion includes a number of stages having airfoils mounted to rotors that convert thermal energy from the hot gases into mechanical, rotational energy. Additional fluid from the compressor is passed through the airfoils and other sections of the turbine portion for cooling purposes. Oftentimes, the turbomachine may be coupled to a load, such as a generator, through a load coupling device.

BRIEF SUMMARY

One aspect of the disclosed technology relates to a load coupling guard having a porous structure for natural ventilation of the load coupling guard.

Another aspect of the disclosed technology relates to a load coupling guard having a porous structure to vent hydrogen coolant leaked into the load coupling guard from an associated generator.

Another aspect of the disclosed technology relates to a load coupling guard separated from an adjacent gas turbine plenum enclosure by a baffle plate which fluidly seals the load coupling guard from the gas turbine plenum enclosure to isolate a ventilation flow field of the load coupling guard from a ventilation flow field of the plenum enclosure.

An exemplary but nonlimiting aspect of the disclosed technology relates to a gas turbine system comprising a load coupling connecting a gas turbine to a load; a load coupling guard at least partly surrounding the load coupling to define an enclosed spaced around the load coupling, wherein the load coupling guard includes a porous sleeve through which gas in the enclosed space is vented to ambient air.

Other aspects, features, and advantages of this technology will become apparent from the following detailed description when taken in conjunction with the accompanying drawings, which are a part of this disclosure and which illustrate, by way of example, principles of this invention.

BRIEF DESCRIPTION OF THE DRAWINGS

The accompanying drawings facilitate an understanding of the various examples of this technology. In such drawings.

DETAILED DESCRIPTION OF THE ILLUSTRATED EMBODIMENTS

Figure 1:
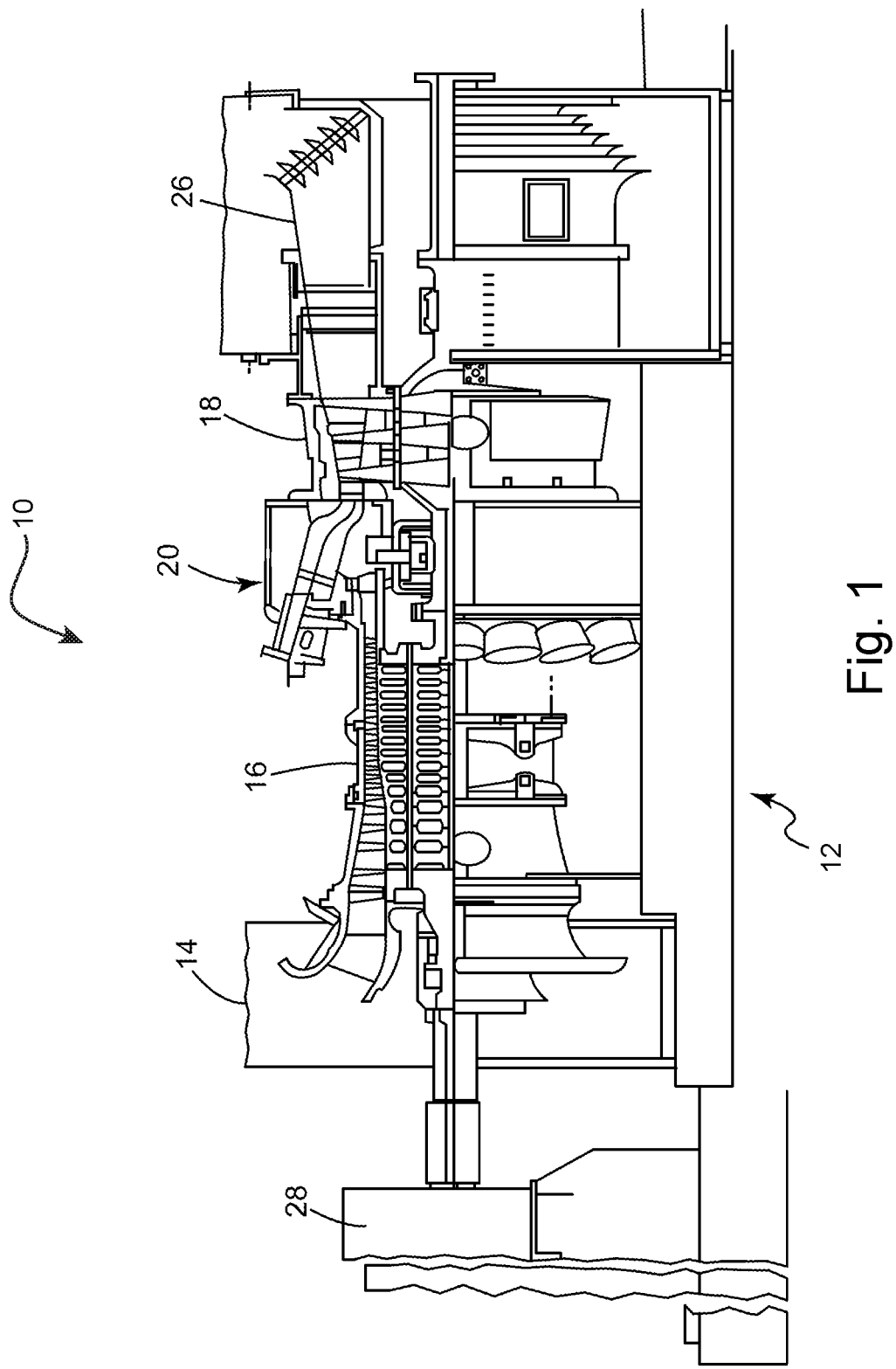
FIG. 1 is a partial cross-sectional side view of a turbomachine system in accordance with an example of the disclosed technology.

FIG. 1 is a partial cross-sectional side view of a turbomachine system 10 in accordance with an embodiment of the disclosed technology. The turbomachine system 10 comprises a turbomachine (e.g., gas turbine 12) and a load (e.g., electrical generator 28) driven by the turbomachine.

An embodiment of the turbomachine system 10 may comprise a gas turbine 12 including an inlet section 14; a compressor section 16 downstream from the inlet section 14; a combustion section 20 downstream from the inlet section 14; a turbine section 18 and an exhaust section 26. The turbine section 18 may drive the compressor section 16 and the electrical generator 28 through a common shaft connection.

Figure 2:
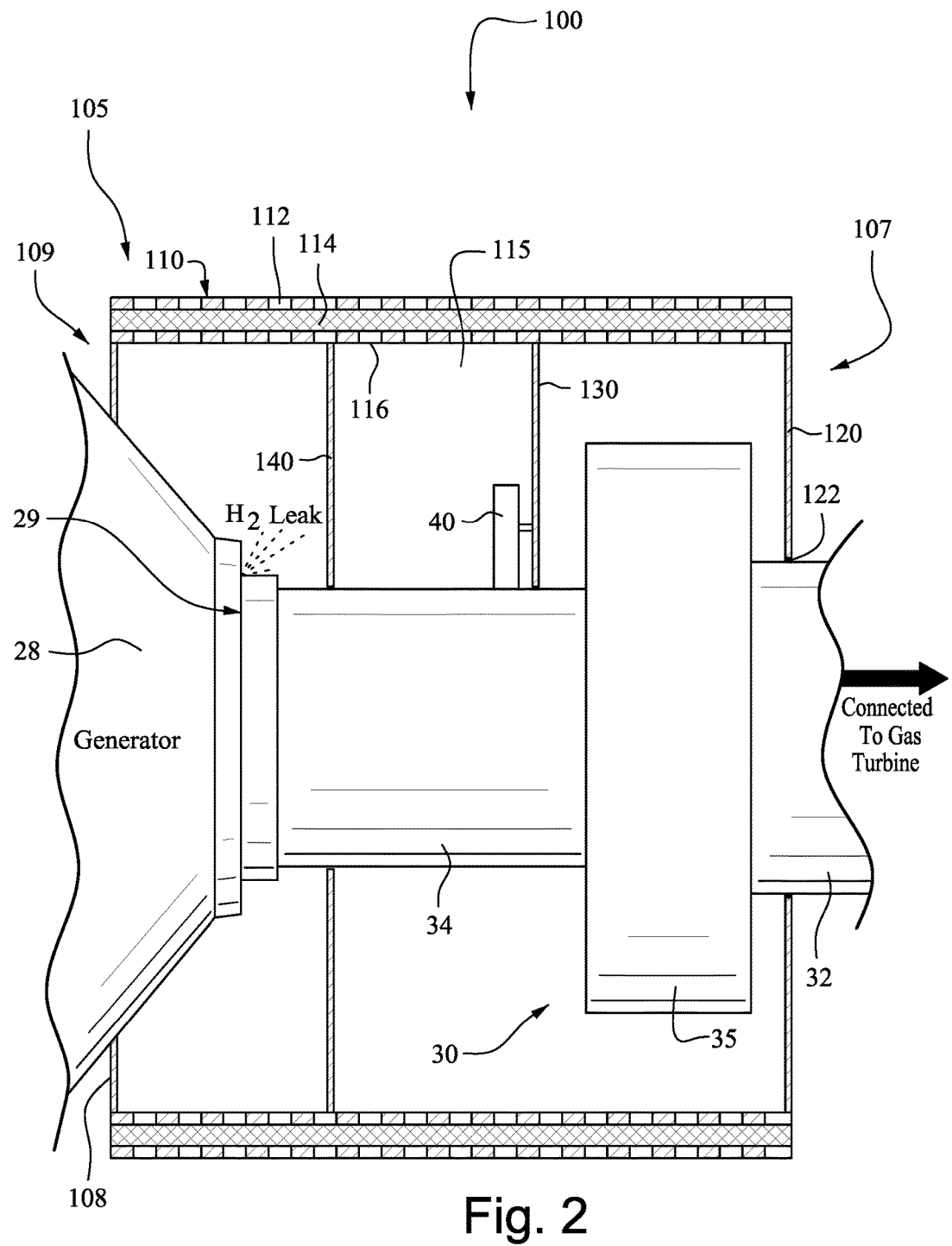
FIG. 2 is a partial cross-sectional view of a load coupling device according to an example of the disclosed technology.

Turning to FIG. 2, a load coupling device 100 comprises a load coupling 30 which provides an interface between the gas turbine 12 and the electrical generator 28. Electrical generator 28 may be coupled to the compressor section 16 through a load coupling shaft 32. Load coupling shaft 32 is arranged to provide an interface between a common compressor/turbine shaft of the gas turbine 12 and a generator input shaft 34. In the illustrated embodiment, load coupling shaft 32 is joined to generator input shaft 34 at a joint 35. As will be detailed more fully below, the load coupling device 100 is configured to limit gases, such as hydrogen (used in the electrical generator 28 as a coolant), from coming into contact with grounding brushes on the generator input shaft 34 or passing into an adjacent plenum enclosure housing the gas turbine 12.

Still referring to FIG. 2, the load coupling device 100 includes a load coupling guard 105 configured to surround or at least partly surround the load coupling 30 thereby defining an enclosed space 115. The load coupling guard 105 has a barrel shape including a porous cylindrical sleeve 110 forming an outer circumferential wall of the barrel. The cylindrical sleeve 110 may comprise an outer sheet 112, an inner sheet 116 and a porous medium 114 disposed between the outer sheet and the inner sheet. Those skilled in the art will recognize that the barrel may have other shapes, such a rectangular cross-sectional shape.

The porous medium 114 may comprise a wire mesh or other suitable porous structure. The outer sheet 112 and the inner sheet 116 may maintain the shape of the porous medium 114. The outer sheet 112 and the inner sheet 116 may be perforated so as to allow the passage of fluids. For example, the outer sheet 112 and the inner sheet 116 may be constructed as perforated metal sheets.

Figure 3:
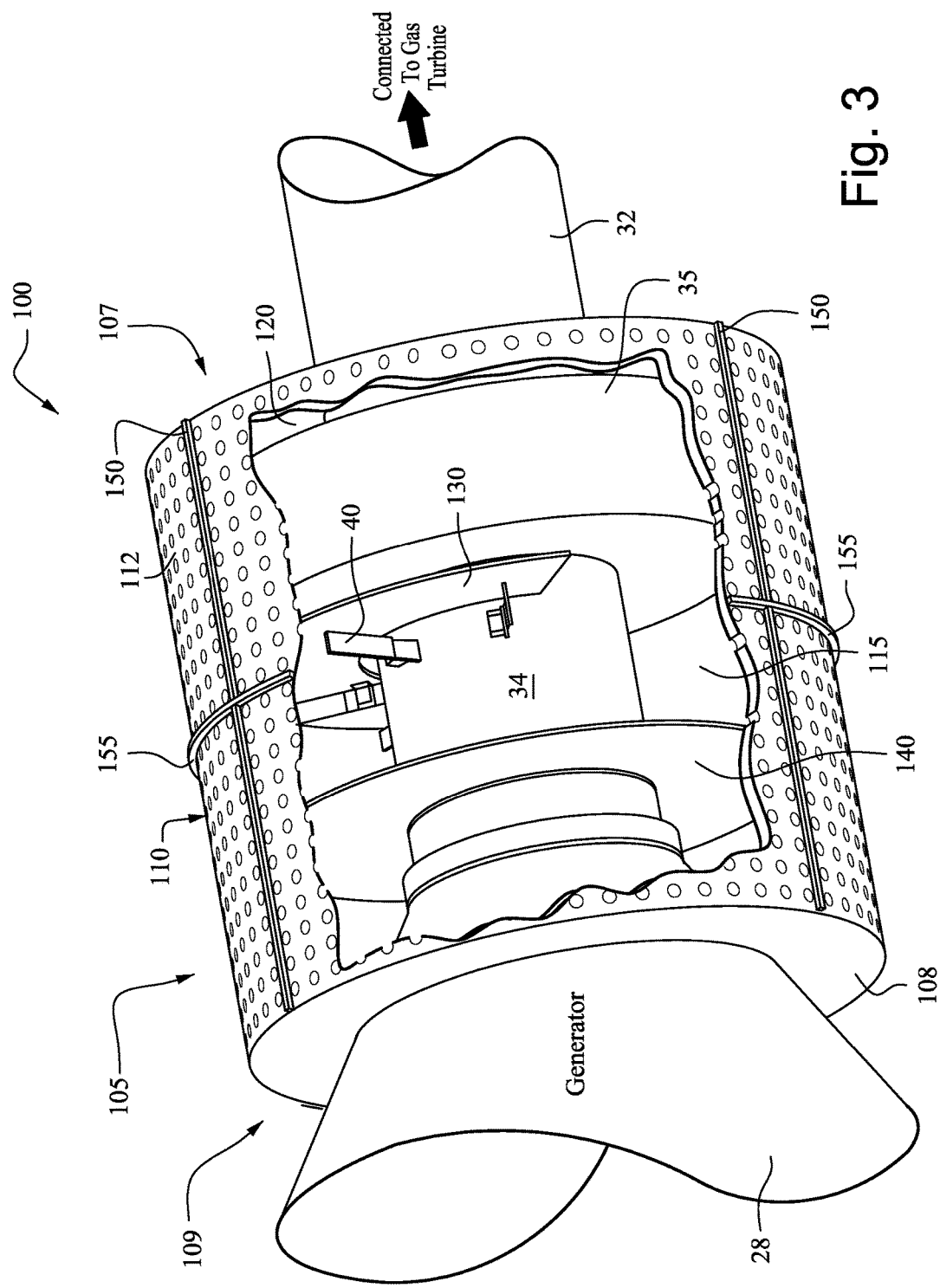
FIG. 3 is a perspective view of the load coupling device of FIG. 2 with a cutaway showing inside a load coupling guard in accordance with an example of the disclosed technology.

The load coupling guard 105 may comprise an axial support (e.g., axial rib 150) and/or a circumferential support (e.g., circumferential rib 155) to support the cylindrical sleeve 110 and aid in maintaining the shape of load coupling guard 105, as shown in FIG. 3. The axial rib 150 and the circumferential rib 155 may be disposed to contact the outer sheet 112 (as shown in FIG. 3) or the inner sheet 116. Those skilled in the art will recognize that any number of the axial ribs 150 and/or circumferential ribs 155 may be used to support the load coupling guard 105 as necessary.

A first end 107 of the barrel-shaped load coupling guard 105 may be closed by a baffle plate 120, as shown in FIG. 2. The baffle plate 120 connects to the cylindrical sleeve 110 and includes an opening to receive the load coupling shaft 32. The baffle plate 120 may form a gap (e.g., 0.2 to 1.0 inch) with load coupling shaft 32. In another example, however, the baffle plate 120 may include a seal 122 to fluidly seal the load coupling guard 105 from the adjacent gas turbine plenum enclosure (not shown) to thereby isolate a ventilation flow field of the load coupling guard from a ventilation flow field of the adjacent plenum enclosure.

A second end 109 of the load coupling guard 105 is closed by an end wall 108. The end wall 108 is disposed with respect to the generator 28 such that the load coupling guard 105 encloses the generator seal 29. It has been found that gaseous hydrogen coolant used in the generator 28 may leak at the generator seal 29, as illustrated in FIG. 2.

Referring to FIGS. 2 and 3, a plurality of grounding brushes 40 may be disposed on generator input shaft 34, as those skilled in the art will understand. A baffle plate 130 may extend from the cylindrical sleeve 110 and be connected to the grounding brushes 40 to support the grounding brushes. Baffle plate 130 may be a partial, arc-shaped, plate extending only partially around generator input shaft 34, as shown in FIG. 3.

There is a risk of explosion if leaked hydrogen reaches the grounding brushes 40. Accordingly, a baffle plate 140 may be disposed along the generator input shaft 34 between the generator seal 29 and the grounding brushes 40 to discourage leaked hydrogen from flowing toward the grounding brushes. Baffle plate 140 may extend from cylindrical sleeve 110 and include an opening to receive generator input shaft 34. A gap, for example 0.2 to 1 inch, may exist between the baffle plate 140 and the generator input shaft 34.

A flow of gas is induced in the load coupling guard 105 due to rotation of the generator input shaft 34. Because of the porous nature of the cylindrical sleeve 110, a substantially uniform pressure field in the radial direction is formed thereby allowing the flow to escape the load coupling guard 105 to ambient air by venting through the cylindrical sleeve 110. This leads to a more uniform static pressure field around the generator input shaft 34 which discourages the flow of hydrogen towards the generator input shaft 34, i.e., the hydrogen moves radially outwardly. As a result, the load coupling guard 105 arrangement causes substantially all of the leaked hydrogen to vent through the cylindrical sleeve 110 in an area between the end wall 108 and the baffle plate 140; thus, the load coupling guard 105 is effective in preventing leaked hydrogen from reaching the grounding brushes 40.

Baffle plates 120, 130, 140 may be formed from plates of sheet metal. In another example, the baffle plates 120, 130, 140 may comprise sound-absorption material sandwiched between sheet metal plates. The sound absorbing material may attenuate noise generated inside the load coupling guard 105 due to shaft rotation, the load coupling 30 and possible surrounding equipment. Additionally, the porous cylindrical sleeve 110 may include sound-absorbing material to arrest noise (e.g., porous medium 114 may comprise sound-absorbing material).

Figure 4:
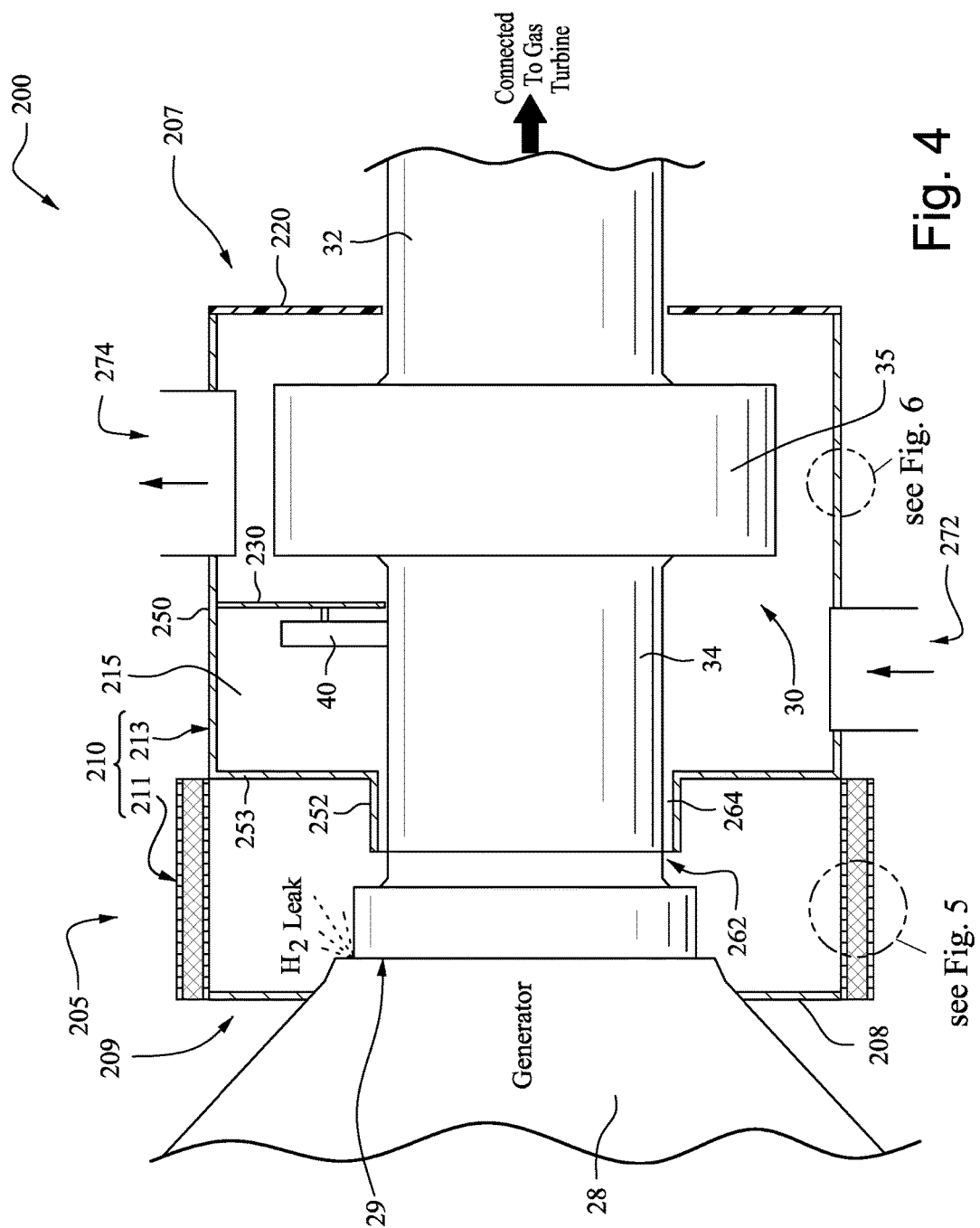
FIG. 4 is a partial cross-sectional view of a load coupling device according to another example of the disclosed technology.

In another example shown in FIG. 4, a load coupling device 200 may be arranged to benefit from a porous outer wall structure (as described above) without the need to construct the entire outer wall as a porous structure.

A load coupling guard 205 may be configured to surround or at least partly surround the load coupling 30 thereby defining an enclosed space 215. The load coupling guard 205 has a barrel shape including a cylindrical sleeve 210. Cylindrical sleeve 210 has a porous section 211 and a non-porous section 213.

Figure 5:
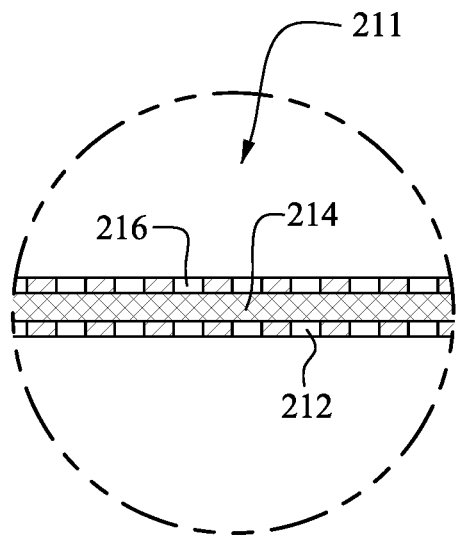
FIG. 5 is an enlarged detail taken from FIG. 4.

Referring to FIGS. 4 and 5, the porous section 211 of the cylindrical sleeve 210 may comprise an outer sheet 212, an inner sheet 216 and a porous medium 214 (e.g. comprising sound absorbing material) disposed between the outer sheet and the inner sheet, as described above with regard to cylindrical sleeve 110. The porous section 211 of the cylindrical sleeve 210 is arranged to correspond to the location of the generator seal 29 to facilitate the flow of leaked hydrogen through the porous section 211.

Figure 6:
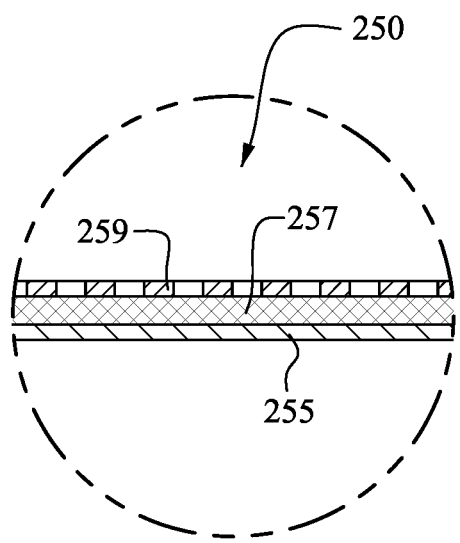
FIG. 6 is an enlarged detail taken from FIG. 4.

The non-porous section 213 of the cylindrical sleeve 210 comprises a wall 250. Referring to FIGS. 4 and 6, wall 250 may comprise a solid, non-porous wall structure, e.g., constructed of metal. In another example, wall 250 may have a layered structure comprising, for example, an outer sheet 255, an inner sheet 259 and an insulating material (e.g. comprising sound absorbing material) disposed between the outer sheet and the inner sheet. The layered structure may be about 4 to 6 inches thick. The inner sheet 259 may be porous, e.g., a perforated metal sheet, while the outer sheet 255 may be a non-porous sold wall structure (e.g., sheet metal). The sound absorbing material may attenuate noise generated inside the load coupling guard, as mentioned above.

Referring to FIG. 4, a first end 207 of the barrel-shaped load coupling guard 205 may be closed by a baffle plate 220, in the same manner as baffle plate 120 described above. The baffle plate 220 connects to wall 250 and includes an opening to receive the load coupling shaft 32.

A second end 209 of the load coupling guard 205 is closed by an end wall 208. A baffle plate 230 may extend from wall 250 and be connected to the grounding brushes 40 to support the grounding brushes, in the same manner as baffle plate 130 described above.

Still referring to FIG. 4, a dividing wall 253 extends from wall 250 at a location between the generator seal 29 and the grounding brushes 40 to discourage leaked hydrogen from flowing toward the grounding brushes. A leg 252 connects to dividing wall 253 and extends axially along the generator input shaft 34 to form an opening 262 to receive generator input shaft 34. A channel 264 is thereby formed between the generator input shaft 34 and the leg 252. Channel 264 is relatively narrow (having a radial height of 0.2 to 2.0 inches, for example) such that gas is discouraged to flow through channel 264 toward the grounding brushes 40 and instead flows radially outwardly through the porous section 211 of cylindrical sleeve 210.

Without ventilation of the enclosed space 215 covered by the non-porous section 213 of the cylindrical sleeve 210, the temperature of the gas in this section (i.e., the non-porous section of the load coupling guard) of the enclosed space 215 may rise due to flow caused by rotation of the generator input shaft 34 and the load coupling shaft 32. Accordingly, an input chimney 272 may be formed in wall 250 to receive a ventilation flow. An output chimney 274 may be formed in wall 250 to discharge hot air from enclosed space 215.

Figure 7:
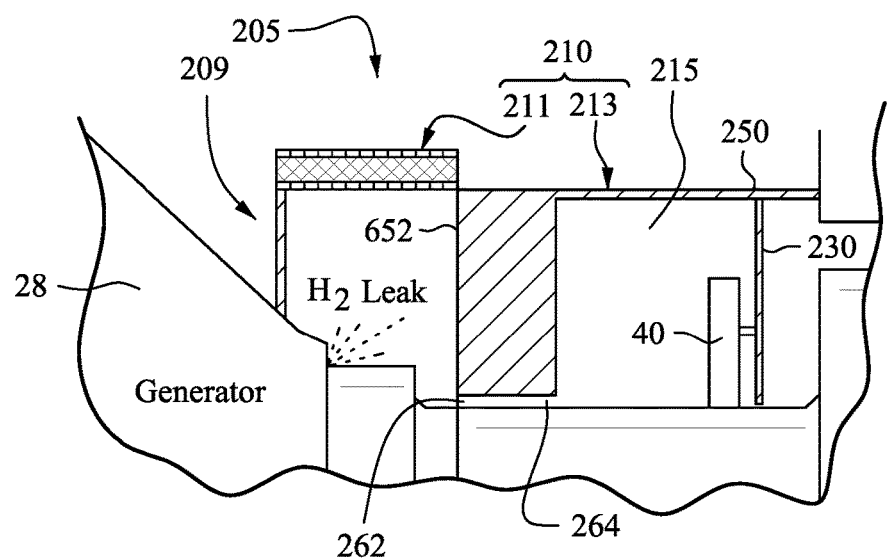
FIG. 7 is a partial cross-sectional view of a load coupling device according to another example of the disclosed technology.

In another embodiment shown in FIG. 7, a thicker dividing wall 652 may be provided instead of the L-shaped structure formed by dividing wall 253 and leg 252 of FIG. 4.

While the invention has been described in connection with what is presently considered to be the most practical and preferred examples, it is to be understood that the invention is not to be limited to the disclosed examples, but on the contrary, is intended to cover various modifications and equivalent arrangements included within the spirit and scope of the appended claims.

What is claimed is:

1. A gas turbine system, comprising:
   a load coupling connecting a gas turbine to a load;
   a load coupling guard at least partly surrounding the load coupling to define an enclosed spaced around the load coupling,
   wherein the load coupling guard includes a porous sleeve through which gas in the enclosed space is vented to ambient air, wherein the porous sleeve includes an inner perforated sheet, an outer perforated sheet, and a porous medium between the inner perforated sheet and the outer perforated sheet.

2. The gas turbine system of claim 1, wherein the porous medium is a wire mesh pad.

3. The gas turbine system of claim 1, wherein the load coupling guard comprises a barrel structure surrounding the enclosed space, the barrel structure including an outer circumferential wall having a porous section and a non-porous section.

4. The gas turbine system of claim 3, wherein the porous section of the outer circumferential wall includes the porous sleeve.

5. The gas turbine system of claim 3, wherein at least one chimney is formed in the non-porous section of the outer circumferential wall to ventilate the non-porous section of the barrel structure.

6. The gas turbine system of claim 3, wherein the barrel structure includes circumferential rings and/or axially extending ribs to structurally support the porous sleeve.

7. The gas turbine system of claim 1, wherein the load coupling guard comprises a barrel structure surrounding the enclosed space, the porous sleeve forming a circumferential wall of the barrel structure.

8. The gas turbine system of claim 7, wherein the barrel structure includes a first baffle plate at a first end thereof, the first baffle plate isolating a ventilation flow field of the load coupling guard from a ventilation flow field of an adjacent gas turbine enclosure.

9. The gas turbine system of claim 8, wherein the load coupling includes a load coupling shaft configured to be connected to a gas turbine and a load input shaft configured to be connected to the load, the first shaft and the second shaft being coupled to one another at a joint.

10. The gas turbine system of claim 9, further comprising at least one grounding brush connected to the load input shaft.

11. The gas turbine system of claim 10, wherein the load coupling guard includes an arc-shaped second baffle plate being connected to the at least one grounding brush to support the grounding brush.

12. The gas turbine system of claim 11, wherein the load is a generator, a second end of the barrel structure is located adjacent the generator, and wherein the load coupling guard includes a third baffle plate between the second end of the barrel structure and the at least one grounding brush to discourage gas in the enclosed space adjacent the second end of the barrel structure from flowing towards the at least one grounding brush.

13. The gas turbine system of claim 12, wherein the third baffle plate has a ring shape with an opening formed therethrough, the load input shaft passing through the opening.

* * * * *